June 14, 1932.                H. J. STEHLI                1,862,832
                           SINTERING MACHINE
                    Filed Feb. 15, 1932      2 Sheets-Sheet 1
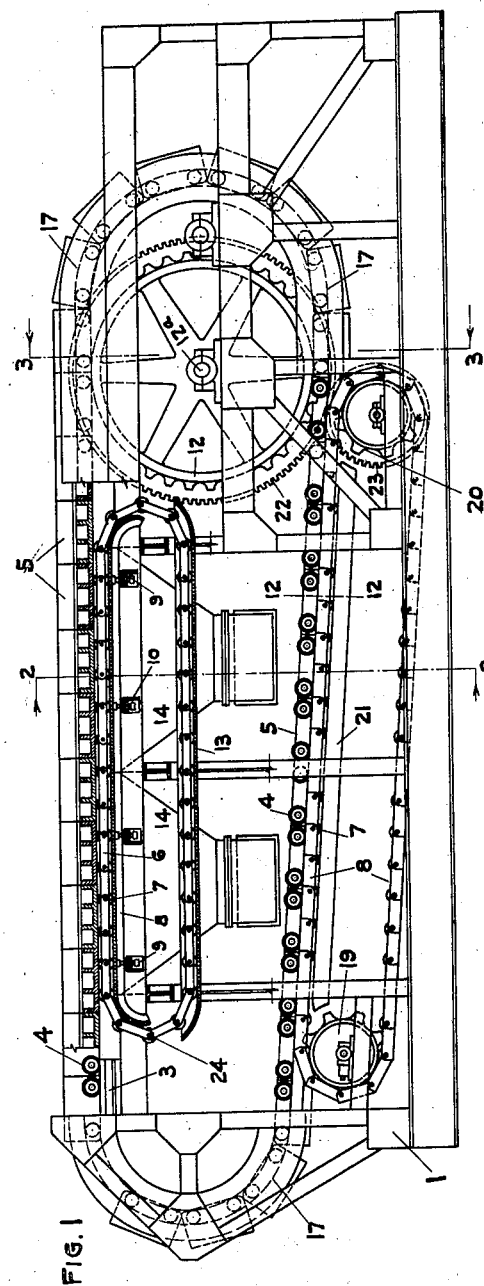
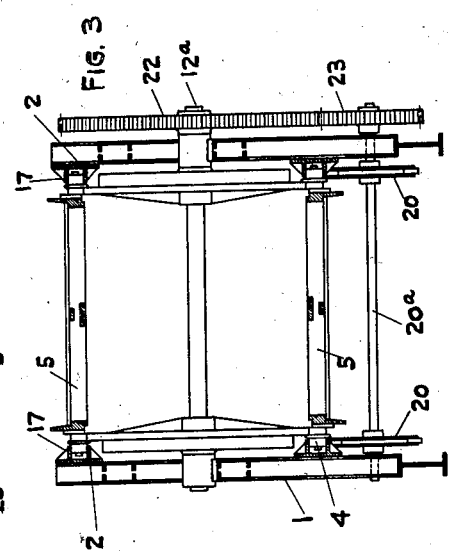
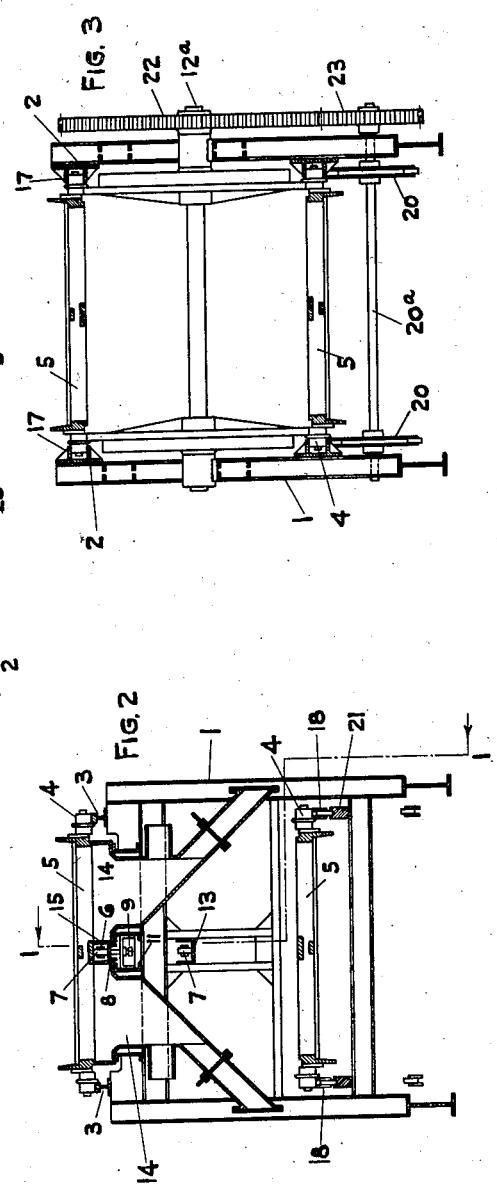
INVENTOR.
H. J. Stehli
BY T. F. Bourne
ATTORNEY June 14, 1932.　　　H. J. STEHLI　　　1,862,832
SINTERING MACHINE
Filed Feb. 15, 1932　　　2 Sheets-Sheet 2
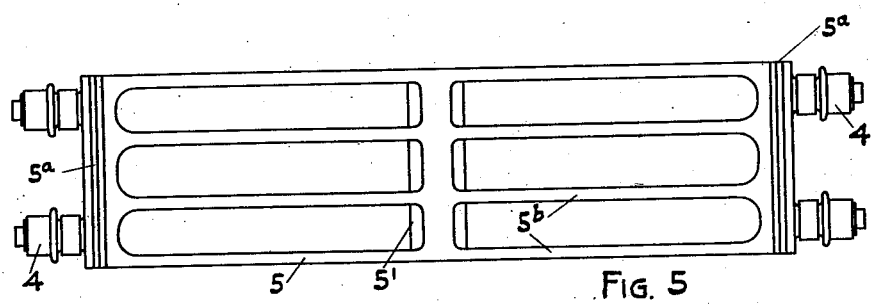
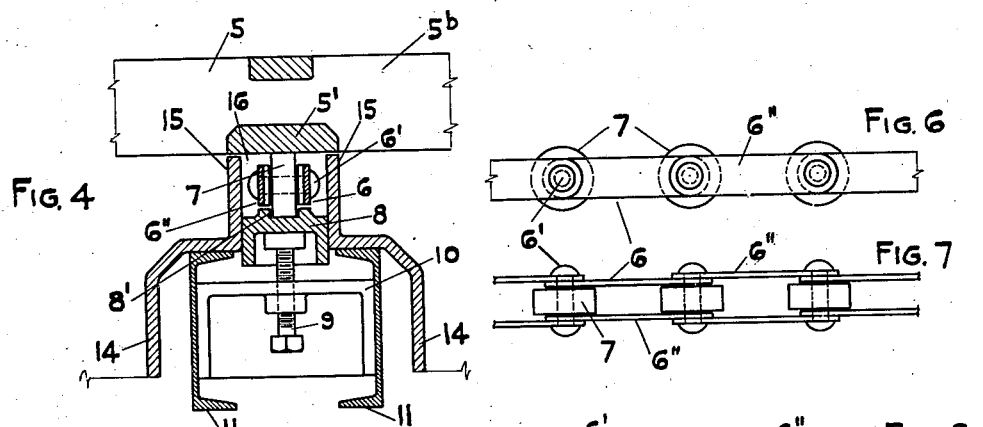
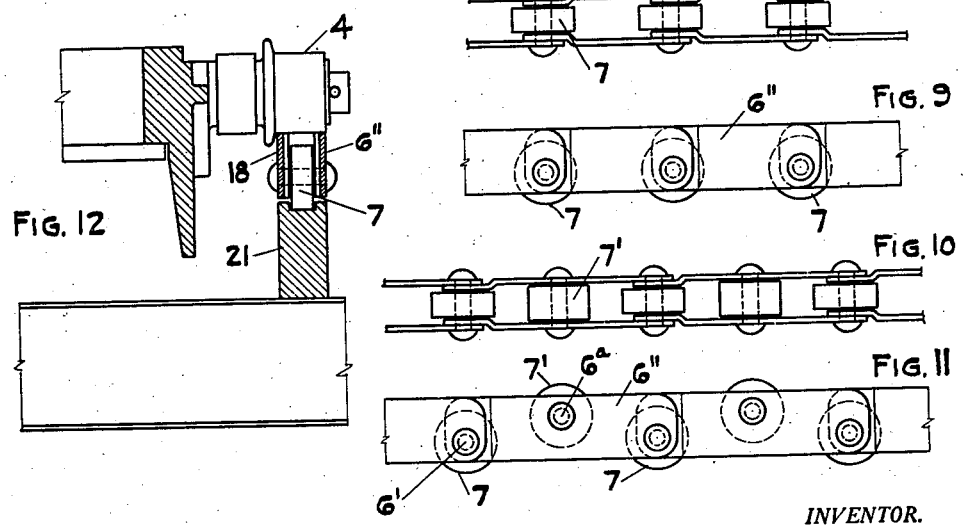
INVENTOR.
H. J. Stehli
BY
D. F. Bourne
ATTORNEY Patented June 14, 1932

1,862,832

UNITED STATES PATENT OFFICE

HENRY J. STEHLI, OF CEDAR GROVE, NEW JERSEY

SINTERING MACHINE

Application filed February 15, 1932. Serial No. 592,896.

Sintering machines have been made of varying lengths and of appropriate widths, the same being provided with upper tracks along which the pallets or carriers travel with their loads, and lower tracks along which the pallets or carriers travel, after discharging their loads, to the mechanism for propelling the pallets along the upper tracks. When the width of the pallets is increased beyond certain limits difficulties arise, and it has been found necessary to make the cross ribs of the pallets (which are girders holding the two sides together) deeper to maintain the strength and rigidity of the pallets. When such depth of ribs is increased the weight of the pallets is also necessarily increased, and a limit to such depth is reached for practical operation, both from the standpoint of cost and from the standpoint of operating conditions. Such pallets or carriers, when they have completed their run along the upper tracks, are obliged to run, one at a time, down an incline and strike against the pallet ahead with a blow or shock sufficiently strong to loosen the cake of sintered material from the slots of the gratebars so that it may be discharged from the pallet. With a relatively narrow sintering machine having light-weight pallets the shock of a pallet against the one ahead is not destructive to the mechanism, but as the individual pallets are made wider, and so carry larger cakes of sintered material, it is necessary, for the proper loosening and discharge of the sinter cake, to increase the distance each pallet drops before it strikes the pallet ahead. To withstand this increased shock, and to support the increased load of material transported, the pallets of a sintering machine must be made disproportionately massive and heavy as the width of the machine is increased, particularly as under certain conditions of operation the cross ribs may be quite hot and hence be particularly subject to sagging under the load. This disproportionate increase in weight accentuates the jolt or shock of the pallets as they strike one another and hence the blow delivered due to the increased weight and increased drop of one pallet to the one ahead, figured in foot pounds, quickly reaches a limit in size beyond which it is not practical to go.

An object of my invention is to support pallets or carriers in a sintering machine at their centers in such a way as to permit the use of pallets or carriers of relatively wide widths but of comparatively light weight, whereby to avoid the difficulties and objection before referred to.

Another object of my invention is to provide movable means to receive the discharged pallets or carriers and to advance the pallets toward the propelling mechanism therefor, whereby to keep the pallets butted up against said mechanism successively to assure the proper propulsion of the pallets and avoid injury to the parts.

A further object is to provide what I term a divided windbox, that is to say, a windbox on either side of the central pallet-supporting means, whereby said means may operate between said boxes to centrally support the pallets travelling on the upper tracks, while at the same time the air may be properly drawn downwardly through the material on the pallets.

My invention comprises novel details of improvement that will be more fully hereinafter described and then pointed out in the claims.

Reference is to be had to the accompanying drawings wherein,

Fig. 1 is a side elevation of a sintering machine embodying my invention, partly in section on line 1, 1, in Fig. 2; Fig. 2 is a cross section on line 2, 2, in Fig. 1; Fig. 3 is a cross section on line 3, 3, in Fig. 1; Fig. 4 is an enlarged detail cross section on the plane of line 2, 2, in Fig. 1; Fig. 5 is a plan view of a pallet or carrier with gratebars removed having means to support its central portion; Figs. 6 and 7 are, respectively, side and plan views of the chain of Fig. 1 for centrally supporting the pallets; Figs. 8 and 9 are, respectively, plan and side views of a different form of chain; Figs. 10 and 11 are, respectively, plan and side views of a modified form of chain, and Fig. 12 is an enlarged detail cross section on the plane of line 12, 12, in Fig. 1.

Similar numerals indicate corresponding parts in the several views.

In the following description and in the claims, various details will be identified by specific names for convenience, but they are intended to be as generic in their application as the art will permit.

The main frame of the sintering machine, which may be of any desired construction, is indicated at 1, at the upper portion of which, on opposite sides, are longitudinally extending tracks 2 and 3, along which the rollers or wheels 4 of the pallets or carriers 5 run, in a usual way. Between the tracks 3 I provide movable means to support the pallets between their rollers 4. In the example illustrated I provide an endless chain 6 having rollers 7 that run upon a bar or rail 8, located between the tracks 3. The bar or rail 8 is preferably provided with a longitudinal groove 8' to guide the rollers 7 and is preferably vertically adjustable, for which purpose I provide screws 9 operative in blocks 10 carried by beams 11 supported by frame 1 and extending longitudinally thereof. The screws 9 are adapted to engage the bottom of the bar 8 for supporting and for vertically adjusting the latter as may be required.

The sides 5a of the pallets or carriers 5 are tied together by cross ribs or girders 5b, and the pallets are provided with longitudinal members 5' which tie the ribs 5b together. The members 5' are located at the central portions of the pallets, and said members are preferably made of angular form at their tops to shed any dust that may fall on them, (Figs. 4 and 5). The members 5' rest upon the rollers 7 of the chain, and as said rollers are supported by the bar 8 the mid-portions of the pallets or carriers are likewise supported to keep them from sagging between the rollers 4. The members 5' may be machined at the same time that the bottoms of the pallets are machined, to present a continuous straight surface over the chain when the pallets are placed end to end on the tracks 3. When the pallets or carriers are propelled along the machine, on the tracks 3, by means of the usual sprockets 12 at the drive end of the machine, the rollers 4 will run on the tracks 3 and the members 5' will rest on the rollers 7; whereby the pallets will not only be supported at their ends, as usual, but also midway therebetween. The movement of the pallets along the tracks 3 will cause the chain to be moved toward the discharge end of the machine by frictional engagement of the members 5' of the pallets with the rollers 7, since the latter will travel and roll along the bar 8 as rotated by the members 5'. The vertical adjustment of bar 8 permits the rollers 7 to be properly located with respect to the members 5' to support the latter as they travel, and an exact distance between the faces of the members 5' and the bar 8 may be maintained, so as to take up wear on the parts. The chain illustrated in Figs. 1, 4, 6 and 7 is of the so-called "side-bar" type, in which the rollers 7 rotate on the pins 6' that connect the side bars 6". An advantage of this type of chain is that the rollers can be made of hardened steel ground to exact dimensions, to maintain an exact distance between the members 5' and the bar 8. If wear occurs between the pins and the side bars of the chain this will not interfere with the proper operation as such wear will not affect the distance between the members 5' and the bar 8. A chain of this type will travel at one-half the rate of travel of the pallets.

In the event that the chain described does not travel sufficiently fast, so that it would become heated up to an undue amount in the length of time taken for a given portion to pass down the length of the windbox, a chain can be substituted in which the side bars project above the tread of the rollers 7 on the upper side, such as shown in Figs. 8 and 9, so that the pallet members 5' will rest on the side bars instead of on the treads of the rollers 7. Such chain will move at the same speed as the pallets, or double the speed of the chain first described. To further increase chain speed the chain shown in Figs. 10 and 11 may be used. In such chain additional rollers 7' rotate on pins 6a between the side bars, the rollers 7' alternating with the rollers 7, the latter projecting below the side bars to run on the bar 8 and the rollers 7' extending above the side bars to support the pallet members 5'. The rollers 7' are free to rotate in one direction while the lower rollers 7 run on the bar 8 and are free to rotate in an opposite direction or at a different speed from the upper rollers.

The chain may be driven by any well-known driving mechanism (not shown) such as an independently driven sprocket wheel, at a speed independent of the speed of the pallets.

To support the lower run of the chain I provide a guide 13 that is supported on the main frame 1 and extends longitudinally (Figs. 1 and 2). The guide 13 is shown in channel form and is adapted to receive a suitable lubricant, which may be a suitable oil or a mixture of deflocculated graphite in water, the opposite ends of the guide 13 being shown extending upwardly to retain the lubricant in the guide, as in a trough. The chain, in dipping down in the guide or trough 13, will be effectively cooled and dirt or grit on the chain will be washed off and settle in the bottom of the guide, so that before the parts of the chain return to support the pallets the chain will be cool, clean and lubricated to resist wear on the chain.

The chain may be replaced in the following way:

One or more of the pins 6' may be threaded at the end, or the pin or pins may be retained by cotter pins or other readily detachable devices. Stopping the machine for a movement, when the threaded pin is a position where it may readily be reached, such as at the point indicated at 24, Fig. 1, the chain can be disconnected at the pin referred to and the end of a new chain may be attached to the worn chain. Now when the machine is started the pallets will cause the old chain to travel, pulling the new chain through the lower run 13, while the loose end of the old chain may be coiled up out of the way. When the end of the old chain arrives at the proper place (as indicated at 24) it may be disconnected from the new chain and the ends of the latter may be connected together, for continued use of the latter.

The divided windbox has portions located on opposite sides of the chain and bar 8. The windbox portions are indicated at 14, and are supported on the main frame 1, the inner upper portions of the wind boxes being shown resting on the beams 11, (Fig. 4). The upper vertical portions 15 of the windboxes are spaced apart on opposite sides of the bar 8, providing a passageway or channel 16 through which the upper run of the chain travels. The upper edges of the windbox portions 14 may be close to the members 5' of the pallets or carriers, to provide a seal, or there may be a small space between said members and the upper edges of the portions 14 to permit cool air to be drawn into the windboxes through the passageway or channel 16 from its ends at the end portions of the machine to cool the chain and keep it from contact with the hot gases drawn down through the bed of sinter on the pallets into the windboxes. As the windowboxes are on opposite sides of the chain and of the pallet members 5', the hot gases from the bed of sinter on the pallets will pass into the appropriate windbox and will not engage the chain or the bar 8, whereby they may be kept in good working condition.

By supporting the mid-portions of the pallets during the time they are carrying the heated load of material the pallets may be made relatively wide, to accommodate the machines of large dimensions, both as to length and width, without requiring that the pallets shall be made of extra heavy construction or be provided with massive cross girders to prevent sagging at their centers. I am, therefore, enabled to provide pallets of relatively light weight, which may drop off of the rails or tracks 3 at the delivery end of the machine and bump against preceding pallets below without injury to the pallets, thereby reducing the cost of construction, maintenance and operation of the machine, since light weight pallets on large machines may be operated with less power than the heavy pallets heretofore proposed and are much less subject to breakage.

It will be understood that for pallets of great width, two or more such supports as before described may be employed, if desired, the windbox in such case being divided into three or more longitudinal sections.

In sintering machines, when the pallets or carriers drop off the upper tracks at the discharge end of the machine they run down along curved tracks and travel to downwardly inclined tracks to be presented to the driving sprockets 12, to be returned to the upper tracks along curved tracks 17 at the propelling end of the machine (Fig. 3). The pallets lie in a continuous line around the driving end curved guide tracks 17 and are pushed in a continuous line along the upper tracks 3, until the pallets reach the discharge end and the rollers or wheels 4 engage the outer curved tracks thereat. The pallet rollers or wheels follow such curve until the pallet assumes such an angle that gravity causes it to fall away from the upper line of pallets. At this point a gap is left in the pallet line, and the pallet runs down around the curved track until it strikes against the one ahead, and from there gravity and the weight of the pallet cause it and the line of pallets ahead to run down the inclined lower track and feed back to the sprocket wheels, by which the pallet is picked up and returned to the upper tracks. As before described, a gap is usually provided at the discharge end to cause the drop of the pallet to give sufficient shock to dislodge the sinter cake and discharge it clear from the pallet. The gap also provides the space necessary to allow for expansion in the line of pallets, due to their rise in temperature. A long sintering machine which has a gap in the line of pallets of, say, 24" when cold, may have only a 16" gap when the line of pallets becomes heated and expands. In relatively short sintering machines the lower tracks may be sufficiently steep to ensure return of the pallets through gravity to the driving sprockets, but even in such machines pallets sometimes hang up on the track due to obstructions such as pieces of sinter or bolts or other objects falling on the track. In such case damage is liable to occur to the mechanism through sprocket teeth not meshing properly with the pallet rollers or wheels and causing jamming of the parts. In a relatively long machine it would require sprocket wheels of a diameter not practicable to ensure sufficient height to give proper pitch to the return tracks. Various devices have been tried to overcome the objections referred to, none of which have been entirely successful. In accordance with my invention I am enabled to provide any gap desired at the point where the gap should be, and still ensure the positive return of pallets from the discharge end of the machine to the driving sprockets, even though the return tracks be made perfectly level or flat, and in sintering machines of almost any length desired. It has been customary for the pallet rollers or wheels to ride on tracks, generally rails, for return to the sprockets. In accordance with my invention I provide movable means upon which the pallet rollers or wheels will ride to direct the pallets from the discharge end of the machine to the sprockets. In the example illustrated I provide endless chains 18, on opposite sides on the machine, which pass over sprockets 19 and 20 that are journaled on the main frame 1, at its lower portion, respectively near the discharge end of the machine and near the sprockets. The chain may be of the side-bar variety and provided with rollers projecting below the side-bars, such as shown in Figs. 8 and 9. The rollers 7 of the chain run on rails 21, supported at the lower part of the main frame 1, preferably of grooved or channel form, to receive the rollers 7 to guide and maintain the chain straight (Fig. 12). The pallet rollers may rest and run on the upper edges of the side bars of the chain, whereby the pallets are movably supported. The sprocket 20 is geared to the shaft 12a of the main sprocket 12 by means of gear 22 secured to said shaft and in mesh with a gear 23 secured to the shaft 20a of sprockets 20 (Figs. 1 and 3). The chains will be driven at a speed greater than the pitch diameter of the sprocket teeth of the pallet driving sprockets 12, with the result that the forward movement of the pallets as governed by the large sprocket speed will be materially less than that of the chains. The construction is such that the pallets roll down the discharge curve and hit the pallet ahead in the usual manner, and the weight of the short line of pallets (below the gap in the line of pallets) is sufficient to cause them by gravity to roll down the curved track and onto the adjacent end portions of the chains below. As soon as a pallet rests on the chains the latter will, by their forward movement toward sprocket 12, tend to move the pallet against the lower line and carry the end pallet into the sprocket teeth as fast as the latter move forwardly, and as the chains move faster than the sprocket teeth the line of pallets on the chains will tend to be pushed close into the sprocket teeth. When the chains have butted a pallet against the sprocket teeth the pallet can move no farther, but the chains will continue moving and the pallet wheels, resting on the chain sidebars, will begin to rotate in reverse direction, allowing the chains to slide past. The pallets thus will be positively fed to the sprockets 12, regardless of whether the rollers of the pallets rotate freely or not. The construction is such that the machine may have perfectly level or flat return tracks, making it possible to provide very long sintering machines without the necessity of making large diameter sprocket wheels and at the same time always ensuring positive return of the pallets from the discharge end of the machine to the sprocket wheels. By this arrangement, the pallets are delivered square against the teeth of sprocket 12, even though they may have become skewed in traveling along the upper track or around the discharge curve, as sometimes occurs, especially in wide machines. The arrangements described are applicable to sintering machines of varying lengths and widths and are particularly useful in permitting successful operation of pallets or carriers for the material to be sintered of greater width than heretofore commercially practicable and economical.

My invention is not limited to the details of construction set forth, as the same may be varied without departing from the scope of the appended claims.

Having now described my invention what I claim is:

1. A sintering machine having means to support pallets adjacent to their sides, and movable means to engage the pallets between their sides to resist sagging of the midportions of the pallets.

2. A sintering machine as set forth in claim 1 in which the movable means comprises an endless chain, and means to support the chain beneath the pallets.

3. A sintering machine as set forth in claim 1 in which the movable means comprises an endless chain provided with rollers, and supporting means for the rollers.

4. A sintering machine as set forth in claim 1 in which the movable means comprises an endless chain provided with rollers extending above and below the chain, and means to support the rollers, some of the rollers being in position to engage the pallets.

5. A sintering machine having means to support pallets adjacent to their sides, a longitudinal bar extending beneath the pallets between said sides during a portion of their travel, and an endless chain operative over the bar to support mid-portions of the pallets to resist sagging of the latter.

6. A sintering machine as set forth in claim 5 in which the chain is provided with rollers to travel on said bar.

7. A sintering machine as set forth in claim 5 provided with a guide beneath the chain having means to retain a lubricant for the chain.

8. A sintering machine as set forth in claim 5 provided with means to raise the bar toward the pallets.

9. A sintering machine provided with spaced tracks to support pallets, a guide bar between the tracks beneath the pallets on the tracks, and an endless chain operative between the guide bar and the pallets to resist sagging of the mid-portions of the pallets.

10. A sintering machine as set forth in claim 9 in which the guide bar is provided with a longitudinal groove, the chain having rollers to travel in said groove.

11. A sintering machine having spaced tracks for pallets, sprocket wheels to propel the pallets along the tracks, and movable means below the tracks to receive the pallets therefrom and advance the latter toward the sprocket wheels.

12. A sintering machine as set forth in claim 11 in which the movable means includes endless chains to support the pallets.

13. A sintering machine as set forth in claim 11 in which the movable means includes endless chains to support the pallets, sprockets supporting said chains, and means to actuate one of the sprockets to move the chain and the pallets thereon toward the sprocket wheels.

14. A sintering machine having spaced tracks for pallets, sprocket wheels to propel the pallets along the tracks, pallets having rollers to run on the tracks, endless chains below the tracks located adjacent to the sprocket wheels, said chains having rollers, rails below the tracks receiving said rollers, said chains being in position to support the rollers of the pallets, and means to actuate the chains to advance the pallets toward the sprocket wheels.

15. A sintering machine as set forth in claim 14 in which the rails have grooves to receive and guide the chain rollers.

16. A sintering machine having tracks to support pallets, means to propel the pallets along the tracks, movable means between the tracks to support the pallets between the tracks, and windboxes on opposite sides of the movable means.

17. A sintering machine having tracks to support pallets, means to propel the pallets along the tracks, an endless chain between the tracks, means to support and guide the chain, pallets having members to be supported by the chain, and windboxes on opposite sides of the chain.

18. A sintering machine as set forth in claim 17 in which the windboxes have upper portions adjacent to the members of the pallets on opposite sides of the chain.

19. A sintering machine as set forth in claim 17 in which the windboxes have upper portions spaced from the members of the pallets to permit air to be drawn along the chain into the windboxes for cooling the chain.

20. A sintering machine as set forth in claim 17 provided with a guide bar for the chain located between the upper portions of the windboxes providing a passageway for air for cooling the chain.

HENRY J. STEHLI.